Sept. 8, 1970

F. I. MITA 3,527,338

ACCUMULATING TRANSFER CONVEYOR

Filed May 10, 1967

INVENTOR.
FRED I. MITA
BY
Farley, Forster & Farley
ATTORNEYS

INVENTOR.
FRED I. MITA

# United States Patent Office 3,527,338
Patented Sept. 8, 1970

3,527,338
ACCUMULATING TRANSFER CONVEYOR
Fred I. Mita, 30571 Springland Drive,
Farmington, Mich. 48024
Filed May 10, 1967, Ser. No. 637,573
Int. Cl. B65g 25/08
U.S. Cl. 198—221                              4 Claims

ABSTRACT OF THE DISCLOSURE

A conveyor for advancing and accumulating objects along a support from a receiving station to a plurality of successive stations, including a driving member reciprocated on forwarding and return strokes and having a plurality of pushers mounted thereon. The pushers are movable to non-driving position on the return stroke of the driving member, and pusher resetting mechanism including object detecting devices at each station is operative to return to driving position preceding a forwarding stroke any pushers at stations in advance of an empty station.

BACKGROUND OF THE INVENTION

Field of the invention

The invention relates to a transfer type of conveyor operative to advance objects such as carriers or work pieces along a support on which a plurality of stations are provided, by operation of a reciprocating driving mechanism with pushers which will advance an object one station on each cycle. The invention provides for selective advance and accumulation of objects under the control of sensing devices at the stations.

Description of the prior art

Reciprocating pusher conveyors are well known, and in some of these conveyors a provision is made for accumulating articles in a bank along the conveyor in response to one article overtaking a preceding article. This type of accumulation does not insure that the conveyor will always be filled with objects to the maximum possible extent, due consideration being given to variations in the rate at which objects are supplied to the conveyor and removed therefrom as in a manufacturing process where the conveyor is employed to feed work pieces from one work station to the next.

The present invention is an improvement upon the type of transfer conveyor disclosed in the co-pending application of Gordon A. Torrance, Ser. No. 637,524 in which the advancing and accumulating action is selectively controlled by sensing devices at each of a plurality of stations along the conveyor; and, in which the object is to advance all objects which precede any empty station along the conveyor on each forwarding stroke of the reciprocating pusher mechanism.

When objects are delivered to the conveyor faster than they are removed, a bank of objects will progressively be accumulated, building up from the discharge end of the conveyor. All objects in this bank will be advanced one station each time an object is removed, and all pushers which precede an empty station anywhere along the length of the conveyor will be activated on each forwarding stroke of the driving mechanism.

SUMMARY OF THE INVENTION

The invention provides an object advancing and accumulating conveyor having frame structure including a support along which the objects are advanced to a plurality of successive stations by pushers of a driving member reciprocated on forwarding and return strokes; and is characterized by means mounting each pusher on the driving member for movement from a driving to a non-driving position on the return stroke of the driving member, positioning means acting to retain a pusher in the position to which it is moved; a sensing device at each station to which an object can be advanced for detecting the absence of an object thereat; and pusher resetting means controlled by each sensing device for returning a pusher at the station next preceding the station of such sensing device to driving position prior to the forwarding stroke of the driving member in response to such sensing device detecting the absence of an object at its station.

The pushers are preferably interconnected so that resetting movement of one pusher to driving position results in corresponding movement of all preceding pushers to driving position.

Other features and advantages of the invention will appear from the following description of the representative embodiment shown in the accompanying drawings:

DESCRIPTION OF THE DRAWINGS

The drawing comprises the following views.

DESCRIPTION OF THE PREFERRED EMBODIMENT

Figure 1:
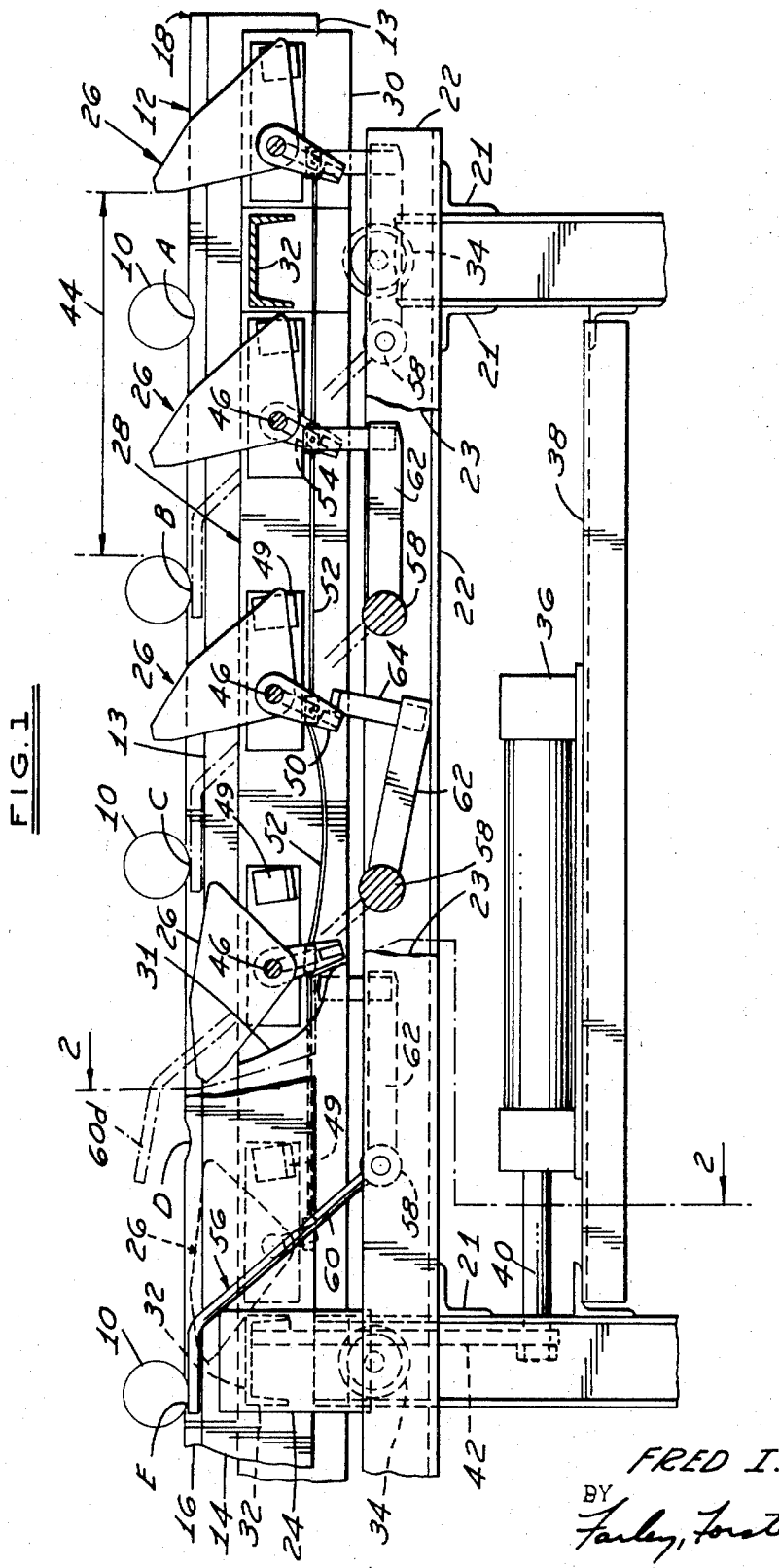
FIG. 1 is a side elevation of a conveyor constructed in accordance with the invention, taken as indicated by the arrows 1—1 of FIG. 2, with parts of the construction broken away and shown in section.

In the construction shown, the objects being conveyed are work pieces 10 which rest upon a support 12 formed by a pair of parallel rails 13 and 14 equipped with wear strips 16 on their upper surfaces, and a series of transversely aligned notches are formed in the strips 16 to define a series of successive stations designated A, B, and C, etc., beginning from the receiving end 18 of the support. The rails 13 and 14 are mounted on suitable frame structure including upright members 20, transverse members 21 and longitudinal members 22. The rails rest on top of the upright members 20 and are secured thereto by side plates 24.

Figure 2:
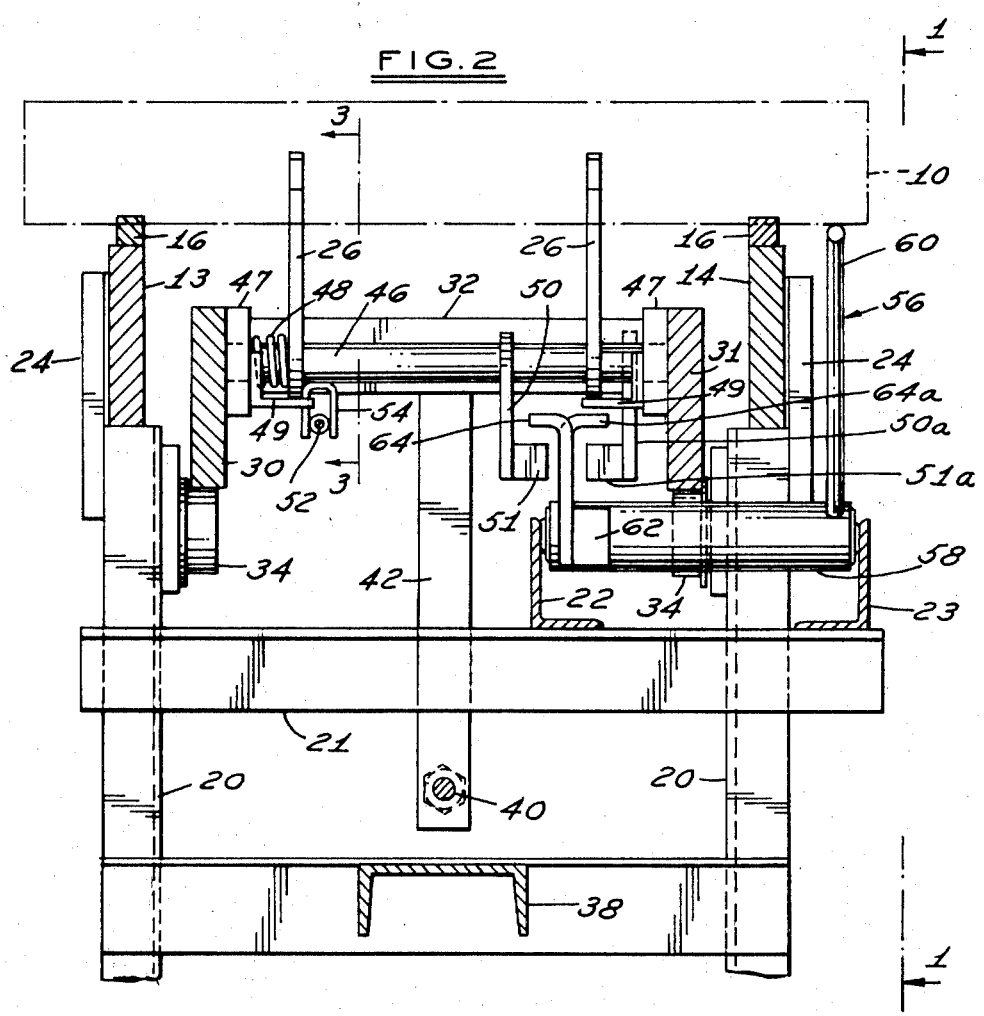
FIG. 2 is a sectional elevation taken substantially as indicated by the line 2—2 of FIG. 1.
Figure 3:
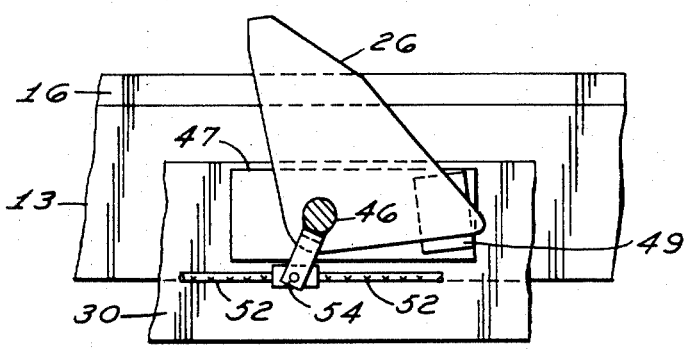
FIG. 3 is a sectional detail of one of the pushers taken as indicated by the line 3—3 of FIG. 2.

Advancing movement is imparted to the work pieces 10 by a series of pushers 26 mounted on a driving member 28, of composite construction best shown in FIGS. 2 and 3. The driving member comprises a pair of parallel bars 30 and 31 transversely connected by channel-shape members 32, and the bars are supported on rollers 34 carried by the frame upright members 20. A fluid pressure actuating cylinder and piston assembly 36, supported on a longitudinal frame member 38, has its piston rod 40 secured to the driving member 28 by a schematically illustrated connection 42, the cylinder and piston assembly being operable to reciprocate the driving member assembly on forwarding and return strokes as indicated by the double arrow 44 in FIG. 1.

The pushers 26 are arranged in pairs, each pair being secured on a transverse shaft 46 which is pivoted in bearing blocks 47 mounted on the sides 30 and 31 of the driving member. Pivotal movement of the shaft 46 is restrained by a compression spring 48 mounted on the shaft and acting against one of the pushers and bearing blocks 47 as a friction element so that the pushers 26 tend to remain in any position to which they are pivoted. The upright driving position of the pushers is defined by a stop 49 secured to a bearing block 47, as shown in FIG. 3.

A pusher positioning element 50 is associated with each pair of pushers. The positioning element 50 is fixed to and depends downwardly from the pusher shaft 46, and is provided with a laterally projecting tab 51 or 51a. As best shown in FIG. 2, the positioning elements 50 on adjacent pusher shafts 46 are offset transversely, the positioning element marked 50a being mounted on the pusher shaft 46 which is next adjacent. The pushers are interconnected by lengths of cable 52 fastened to a fitting 54 fixed to each of the shafts 46.

A sensing device generally designated 56 is provided for each of the stations to which an object is advanced, that is, all stations except Station A. Each sensing device 56 consists of a shaft or roller 58 rotatably supported between the frame members 22 and 23 (FIG. 2) and having an object engaging portion or arm 60 extending upwardly for engagement by an object at the station served by the station sensing device, and a pusher controlling portion or arm 62 extending in the opposite direction from the arm 60 toward the next preceding station. Each pusher controlling arm 62 acts as a counterweight to normally bias the sensing device to a position in which the object engaging arm 60 extends into the path of movement of an object approaching the pusher station, this position being defined by the arm 62 abutting the horizontal flange of the frame member 22.

A pusher controlling tab 64 or 64a is secured to the end of the arm 62 of the sensing device, and as shown in FIG. 2, the tabs 64 and 64a of the sensing devices at adjacent stations have oppositely projecting terminal portions corresponding to the tabs 51 and 51a of the pusher positioning elements 50 and 50a respectively.

Naturally, the conveyor can be made in any size and length required to provide the number of stations desired, the structure shown in FIG. 1 including only enough stations to illustrate the operation. In this view, the driving member 28 is shown at the end of a return stroke, with stations A, B, and C occupied by a work piece 10, station D empty, and station E together with any successive stations (not shown) also occupied by a work piece. As the driving member 28 travels on the return stroke, any pusher which encounters a work piece will be moved from driving to a non-driving position in response to engagement therewith, and this movement will be imparted to all successive pushers through the cables 52. For example, on the return stroke the first pusher at the right end of the conveyor in FIG. 1 encountered the work piece 10 at station A, and the second and third pushers from the right likewise encountered a work piece at stations B and C. This engagement between the pushers and work pieces caused the pushers to be moved toward non-driving position to permit the pushers to pass under the work pieces, and this movement was imparted to all successive pushers such as the fourth and fifth pushers through the cables 52. In other words, all pushers, were moved to non-driving position.

The absence of a work piece at station D resulted in the arm 60d of the sensing device for that station assuming the position shown in which the pusher controlling arm 62 and its tab 64 of this sensing device, located adjacent the preceding station C, extend into the path of movement of the pusher positioning element 50–51. The ensuing abutment between the tabs 64 and 51, occurring just prior to the end of the return stroke, places the third pusher from the right back in driving position as shown. This return movement of the pusher to driving position was imparted to the preceding, or first and second pushers to the right, through the cables 52.

Thus, on the return stroke of the driving member, any pusher passing a station occupied by an object is moved to non-driving position in response to engagement therewith, this movement being transmitted to all succeeding pushers toward the discharge end of the conveyor through the pusher connecting means of cables 52. Likewise on the return stroke of the dirving mechanism, the pusher positioning means controlled by each sensing device is operative to return a pusher to driving position at the next station in advance of the station at which the absence of an object is detected by such sensing device. This pusher return movement is transmitted through the pusher connecting means or cables 52 to all preceding pushers toward the head end of the conveyor.

The construction disclosed and described herein, while constituting a presently preferred embodiment of the invention, is also intended as representative only of the structural and operational principles thereof. Variations of this disclosure will obviously have to be made in adapting the principles of the invention to conveyors designed to handle particular sizes and configuration of objects, including objects such as pallets or carriages upon which a work piece or other article to be conveyed is carried. Such variations and modifications as are within the scope of the following claims are therefore to be considered a part of the present invention.

I claim:
1. In a conveyor for accumulating and advancing work pieces at a plurality of successive stations along a support, the improvement comprising:
   a reciprocal carriage,
   means for driving the carriage on advance and return strokes;
   a plurality of work piece pushers mounted on the carriage, each pusher being movable from a driving to a non-driving position;
   a sensing element at each station for detecting the absence of a work piece at such station;
   pusher positioning means controlled by each sensing element for placing a pusher in driving position at the next station in advance of a station at which the absence of a work piece is detected;
   each pusher being movable to non-driving position in response to engagement with a work piece on the return stroke of the carriage, and connecting means between pushers operative to move to non-driving position any pusher which follows a pusher moved to such position by engagement with a work piece on the return stroke of the carriage.

2. A conveyor according to claim 1 wherein said connecting means between pushers comprises a cable type of element operative to return to driving position any pusher which precedes a pusher returned to such position by the pusher positioning means.

3. A conveyor according to claim 1 further including friction means tending to maintain each pusher in the position to which it is moved.

4. An object advancing and accumulating conveyor having frame structure including a support along which the objects are advanced to a plurality of successive stations by pushers of a driving member reciprocated on forwarding and return strokes, characterized by:
   means mounting each pusher on the driving member for movement from a driving to a non-driving position on the return stroke of the driving member, and positioning means acting to retain a pusher in the position to which it is moved;
   a sensing device at each station to which an object can be advanced for detecting the absence of an object thereat, each sensing device being movably mounted on the frame structure and having an object engaging portion located adjacent the station of such sensing device and a pusher controlling portion located adjacent the next preceding station thereto; and
   pusher resetting means controlled by each sensing device for returning a pusher at the station next preceding the station of such sensing device to driving position prior to the forwarding stroke of the driving member in response to such sensing device detecting the absence of a work piece, the pusher resetting means including a pusher positioning element operatively associated with each pusher, the pusher positioning element being engageable on the return stroke of the driving member with the pusher controlling portion of a sensing device; and, means interconnecting the pushers whereby resetting movement of one pusher to driving position results in corresponding movement of all preceding pushers to driving position, said means interconnecting the pushers being operative to move all pushers to non-driving position which follow a pusher moved to such position by engagement with an object in the path of movement of such pusher on the return stroke of the driving member.

References Cited

UNITED STATES PATENTS

| | | | |
|---|---|---|---|
| 3,322,259 | 5/1967 | Milazzo | 198—219 |
| 3,369,650 | 2/1968 | Caretto | 198—219 |

EDWARD A. SROKA, Primary Examiner